United States Patent [19]

Takizawa et al.

[11] 4,171,901

[45] Oct. 23, 1979

[54] DEVICE FOR CONTROLLING ADVANCE AND RETURN MOVEMENTS OF ORIGINAL TABLE OF ELECTROSTATIC COPYING APPARATUS

[75] Inventors: Tatsuji Takizawa, Yokohama; Tomoyuki Ishida, Tokyo; Nobutaka Noda, Kawasaki; Masakazu Yoshino, Tokyo, all of Japan

[73] Assignee: Kabushiki-Kaisha K I P, Tokyo, Japan

[21] Appl. No.: 851,208

[22] Filed: Nov. 14, 1977

[30] Foreign Application Priority Data

Nov. 18, 1976 [JP] Japan .................................. 51/137825

[51] Int. Cl.$^2$ ............................................ G03G 15/28
[52] U.S. Cl. ........................................... 355/8; 355/66
[58] Field of Search ........................ 355/8, 66, 3 R, 11

[56] References Cited

U.S. PATENT DOCUMENTS

| Re. 29,407 | 9/1977 | Ogawa .............................. 355/66 X |
| 3,918,806 | 11/1975 | Cook ...................................... 355/8 |
| 3,990,792 | 11/1976 | Kono et al. ........................ 355/66 X |
| 4,118,118 | 10/1978 | Barto ..................................... 355/8 |

*Primary Examiner*—R. L. Moses
*Attorney, Agent, or Firm*—Martin Novack

[57] ABSTRACT

A device for controlling advance and return movements of an original table of an electrostatic copying apparatus wherein the table is advanced in timed relationship with the movement of a photosensitive element and returned under the action of a spring to its initial position comprising a first shaft rotatable in timed relationship with the movement of said photosensitive element, a second shaft rotated at a predetermined speed in one direction, a stepped pulley mounted on said first shaft for free rotation relative thereto, a first pulley co-axially mounted on said first shaft through an one-way clutch operable when said first pulley rotates relative to said second shaft in said direction of rotation thereof, a first wire passing around said first pulley and which is connected at its one end to a smaller diameter portion of said stepped pulley and at the other end through a spring to said original table, a second wire passing around a larger diameter portion of said stepped pulley and connected at its opposite ends to said original table for movement therewith, ratchet means provided on said stepped pulley for pivotal movement under resilience, latch means operable to engage with said ratchet means at the initial position thereby initiating the advance movement of said original table while tensioning said spring, releasing means for releasing said latch means to disengage said stepped pulley from said first shaft at a predetermined angular position thereof thereby causing the return movement of said original table under the action of said spring to the original position, and operating means for selectively operating said ratchet means at the initial position to cause engagement between the latter and said latch means.

24 Claims, 7 Drawing Figures

DEVICE FOR CONTROLLING ADVANCE AND RETURN MOVEMENTS OF ORIGINAL TABLE OF ELECTROSTATIC COPYING APPARATUS

BACKGROUND OF THE INVENTION

This invention relates to a device for controlling advance and return movements of an original table of an electrostatic copying apparatus and, more particularly, to such a device provided with a mechanism for causing return movement of the original tube by a spring force.

It has hitherto been proposed to provide a mechanism for controlling the advance and return movements of the original table in which a spring is connected at its one end to the movable original table and at the other end to a frame of a copying apparatus, the original table being scanned by suitable driving means, and when the original table contacts with a limit switch provided at the end of the scanning stroke, the original table is disengaged from the driving means to return to the initial position under the action of said spring.

In such a mechanism, however, there are disadvantages that the speed of the return movement of the original table only depends upon the rate of the spring itself such that the spring rate must be increased and thus vibration of the original table may be caused when it abuts against a stop provided at the initial position and a relatively long waiting time is required to initiate a subsequent scanning stroke of the original table, and that as the time lapses the rate of the spring is decreased to vary the position at which the original table is stopped at the end of its return movement.

SUMMARY OF THE INVENTION

An object of the present invention is to provide a novel device for controlling advance and return movements of an original table of an electrostatic copying apparatus in which the above-mentioned disadvantages of the conventional mechanism are removed.

Another object of the present invention is to provide a device for controlling advance and return movements of an original table of an electrostatic copying apparatus in which the control is fully achieved by mechanical means without provision of any electrical means, such as a limit switch.

According to the present invention, there is provided a device for controlling advance and return movements of an original table of an electrostatic copying apparatus wherein the table is advanced in timed relationship with the movement of a photosensitive element and returned under the action of a spring to its initial position comprising a first shaft rotatable in timed relationship with the movement of said photosensitive element, a second shaft rotated at a predetermined speed in one direction, a stepped pulley mounted on said first shaft for free rotation relative thereto, a first pulley co-axially mounted on said first shaft through an one-way clutch operable when said first pulley rotates relative to said second shaft in said direction of rotation thereof, a first wire passing around said first pulley and which is connected at its one end to a smaller diameter portion of said stepped pulley and at the other end through a spring to said original table, a second wire passing around a larger diameter portion of said stepped pulley and connected at its opposite ends to said original table for movement therewith, ratchet means provided on said stepped pulley for pivotal movement under resilience, latch means operable to engage with said ratchet means at the initial position thereby initiating the advance movement of said original table while tensioning said spring, releasing said latch means to disengage said stepped pulley from said first shaft at a predetermined angular position thereof thereby causing the return movement of said original table under the action of said spring to the original position, and operating means for selectively operating said ratchet means at the initial position to cause engagement between the latter and said latch means.

DESCRIPTION OF THE PREFERRED EMBODIMENTS

Figure 1:
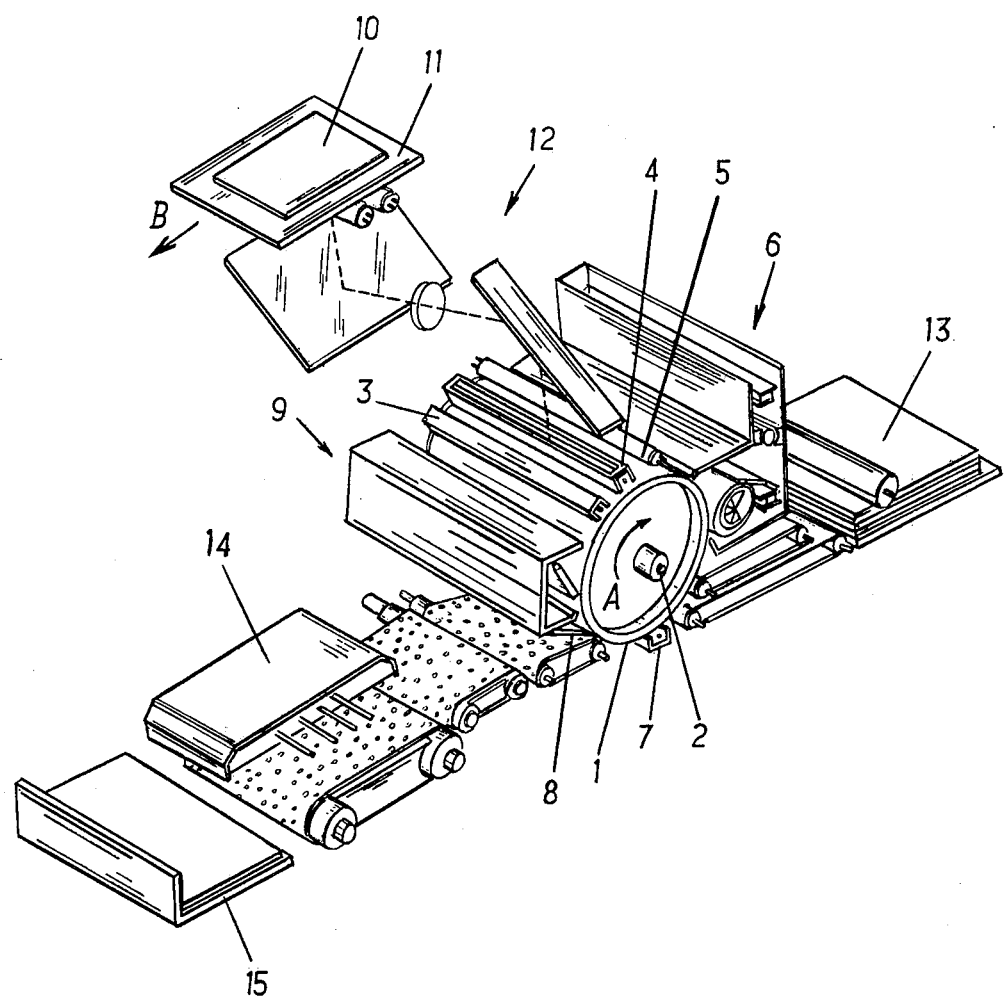
FIG. 1 is a perspective view partly broken away of an example of an electrostatic copying apparatus which can be incorporated with a device for controlling advance and return movements of an original table of the present invention.

Referring first to FIG. 1, a reference numeral 1 designates a typical type of a cylindrical photosensitive element which comprises an electrode layer, a photoconductive layer, a transparent insulating layer and these layers being bonded in the order described above, and the element is fixed to a shaft 2 to rotate at a predetermined speed in a direction of an arrow A. First and second corona dischargers 3 and 4, a uniform light illuminating device 5, a developing device 6, an image transfer corona discharger 7, a sheet separating device 8 and a cleaning device 9 are operationally disposed around and in the vicinity of the element 1.

In use and as the element 1 rotates, charges of an appropriate polarity are uniformly deposited by the first corona discharger 3 on the surface of the element 1, charges of the opposite polarity being then deposited by the second corona discharger 4 on the surface of the element simultaneously with the projection of a light image of an original 10 on an original table 11 by a lighting device 12 through the corona discharger 4 and a uniform light being then projected by the device 5 to the surface of the element such that a high contrast of an electrostatic latent image corresponding to the original 10 is formed on the surface of the element. The latent image so formed is then converted by the device 6 to a developer powder image. A receptor sheet 13 is fed in timed relationship with the rotation of the element 1 to contact with the latter, whereupon the powder image is transferred to the sheet 13 under the action of the corona discharger 7. The sheet 13 which has been separated by the device 8 from the surface of the element 1 is fed to a fixing device 14 in which the powder image is fused by heat and fixed to the sheet 13 thereby forming a permanent copy image thereon. Thereafter, the sheet 13 is fed onto a tray 15 attached to the frame of the copying apparatus.

The original table 11 for supporting the original 10 is moved from its initial position in a direction of an arrow B in timed relationship with the rotation of the element 1, and then returned rapidly to the initial position after the projection of the light image of the original 10 by the device 12 to the element 1 has been ceased.

An embodiment of the device for controlling advance and return movements of the original table in accordance with the present invention will next be described by reference to FIGS. 2 and 3.

Figure 2:
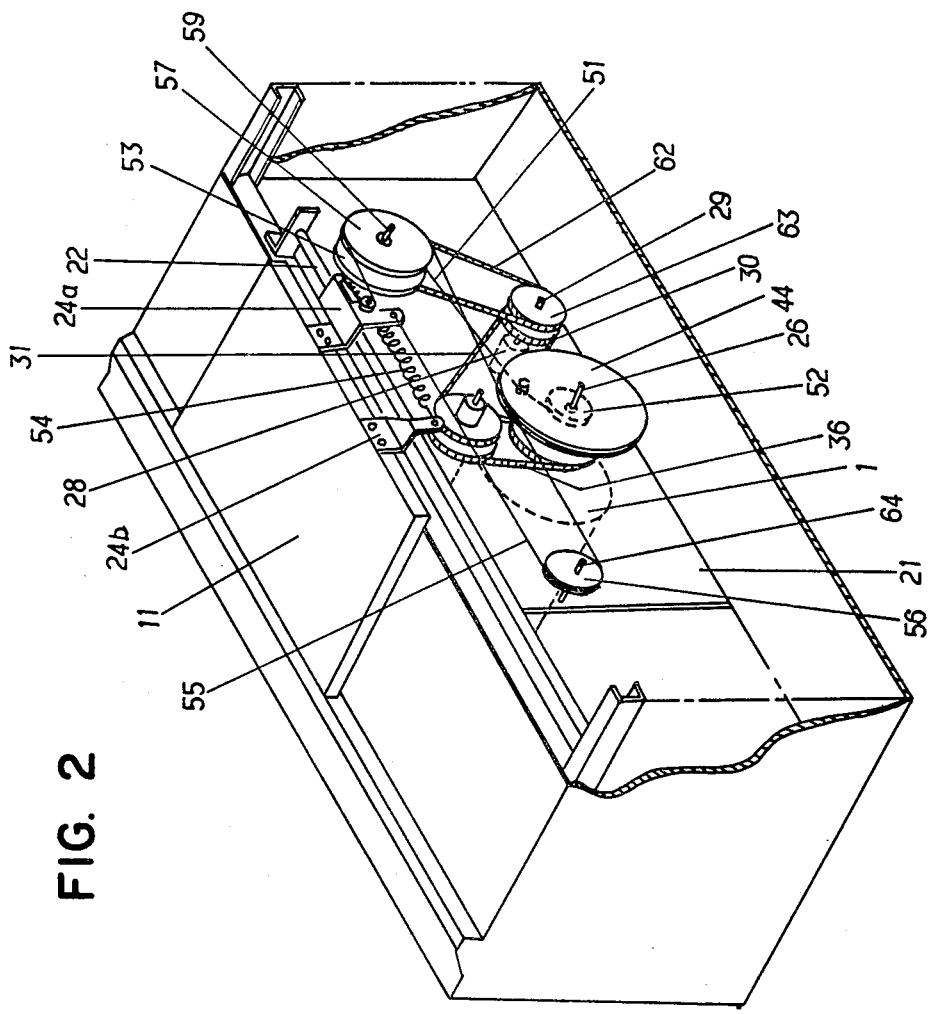
FIG. 2 is a perspective view partly broken away of an embodiment of the device in accordance with the present invention.
Figure 3:
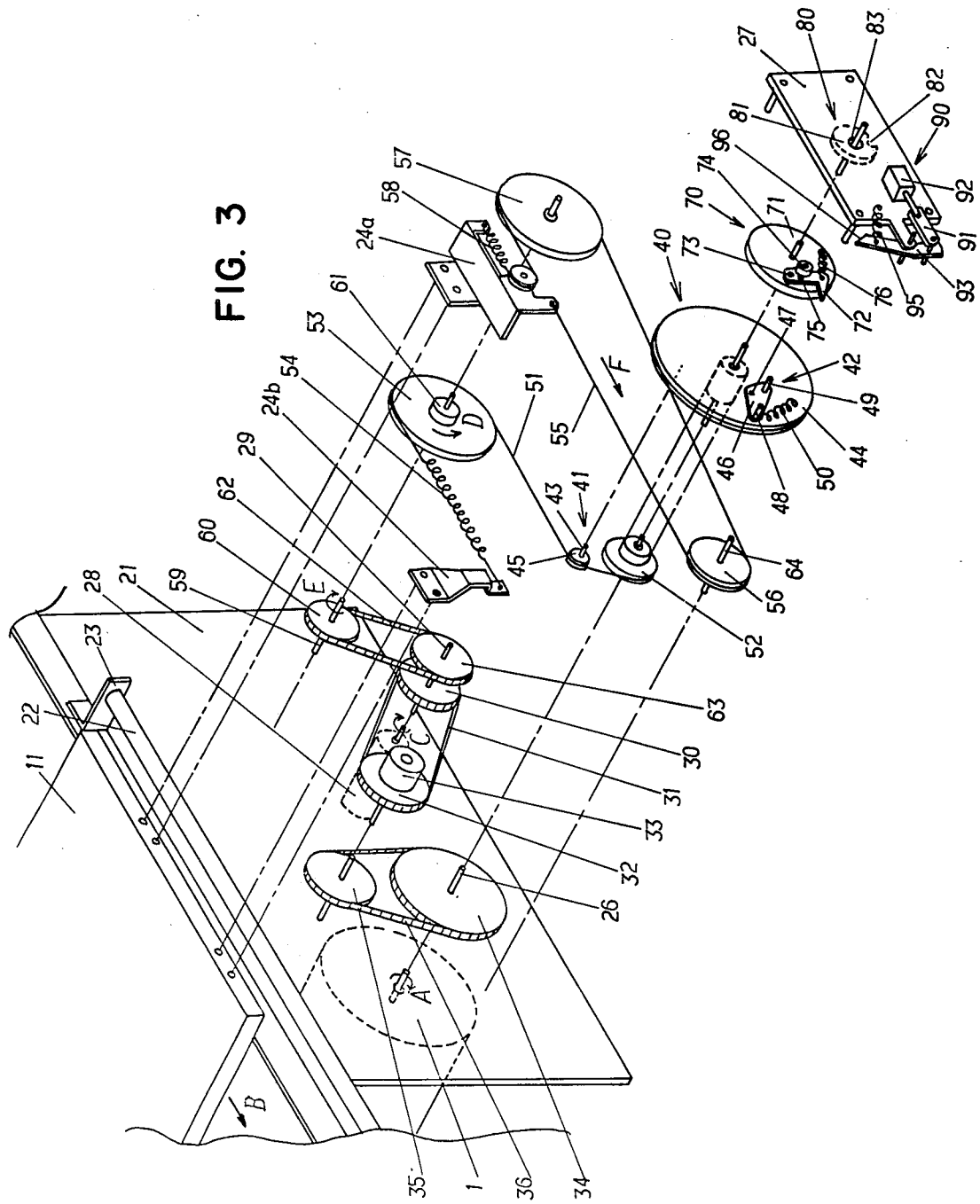
FIG. 3 is an exploded perspective view of the device of FIG. 2.

FIG. 2 is a perspective view partly broken away of the device for controlling advance and return movements of the original table under the condition that the original table is held at the initial position and FIG. 3 is an exploded perspective view of the device of FIG. 2.

A reference numeral 21 designates a side plate fixed to the frame of the electrostatic copying apparatus, and provided above the plate 21 is a guide rod 22 which is spaced apart from and in parallel with the plate. The rod 22 is fixed at one end to a member 23 also secured to the frame, the member 23 further acting as a stop against which a trailing end of the original table 11 abuts at its initial position. The original table 11 is provided at its one side with carrier members 24a and 24b which are slidably supported on the guide rod 22 by suitable means not shown. The drum-like photosensitive element 1 is secured to a first rotating shaft 26 which is extending through and rotatably supported by the side plate 21 and a further plate 27 secured to but spaced apart from the latter, the element 1 being positioned adjacent to an inner side of the plate 21.

There is provided a motor 28 having a driving shaft 29 which is rotatable at a predetermined speed in a direction of an arrow C, the shaft 29 being provided with a sprocket wheel 30. The wheel 30 is in engagement with a chain 31 which also passes around a sprocket wheel 32 fixed to a driving part of an electromagnetic clutch 33, the latter being supported by suitable means (not shown) on the plate 27. Further sprocket wheels 34,35 are, respectively, secured to the shaft 26 and a driven part of the clutch 33 and the wheels 34, 35 are connected by a chain 36 to each other. With the arrangement, when the motor 28 and the clutch 33 are energized, these sprocket wheels and the chains are driven to rotate the shaft 26 and thus the element 1 in the direction of the arrow A.

Figure 4:
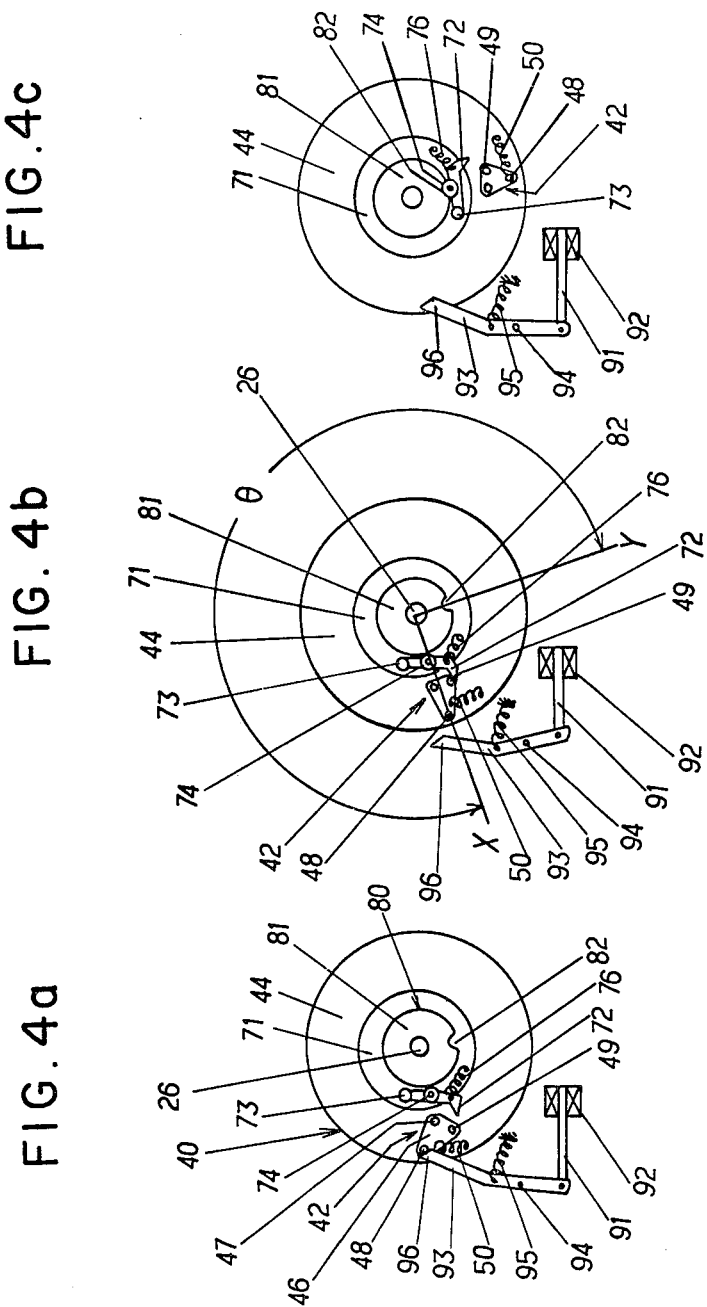
FIGS. 4(a), (b) and (c) are side views of a portion of the device of FIG. 2 showing parts in their different positions.

A stepped pulley 40 is supported on the shaft 26 to rotate relative thereto and provided with damping means 41 for damping the movement of the original table and ratchet means 42 co-operable with latch means 70 described hereinlater. The means 41 comprise a shaft 43 eccentrically fixed to a larger diameter portion 44 of the pulley 40 and a pulley 45 rotatably mounted on the shaft 43. The means 42 also includes a generally triangular plate 46 which is pivotally mounted on a shaft 47 eccentrically secured to the portion 44 of the pulley 40, the plate 46 being provided with first and second pins 48, 49 fixed thereto. Fixed to the pin 48 is one end of a spring 50 which is also secured at the other end to a side portion of the larger diameter portion 44 of the pulley 40, the spring 50 serving to bias the plate 46 in an anti-clockwise direction as seen in FIG. 4(a). A first wire 51 is connected at its one end to a periphery of a smaller diameter portion 52 of the pulley 40 and extends therefrom around the periphery of a pulley 53 positioned near the initial position of the table 11, and the other end of the wire 51 is connected to one end of a spring 54 which is also connected at the other end to the member 24b for providing power to cause the return movement of the table 11. When the pulley 40 is in its initial position shown in FIG. 3, the pulley 45 is engaged at its periphery with the wire 51 to tension the latter against the action of the spring 54. Fixed at one end to the member 24a is a second wire 55 which, in turn, extends around a periphery of a pulley 56 positioned near the forward stroke end of the table 11, and is wound by at least one turn around the periphery of larger diameter portion 44 of the pulley 40 and further passes around a pulley 57 provided co-axially with the pulley 53, and the other end of the wire 55 is connected through a spring 58 to the member 24a. The spring 58 serves to tension the wire 55 at a substantially constant rate.

Rotatably supported by the plate 21 is a second shaft 59 to which a sprocket wheel 60 and an one-way clutch 61 are fixed, and the latter is provided between the shaft 59 and the pulley 53. Further, the shaft 59 supports the pulley 57 for free rotation relative thereto. The one-way clutch is released when the pulley 53 rotates relative to the shaft 59 in a direction of an arrow D, and locked when the pulley 53 rotates in the opposite direction. A chain 62 passes around the sprocket wheel 60 and a sprocket wheel 63 fixed to the shaft 29 of the motor 28 such that the shaft 59 is rotated in a direction of an arrow E when the motor 28 is energized. The pulley 56 is rotatably supported on a shaft 64 secured to the plate 21.

Latch means 70 for transmitting the rotating force of the shaft 26 to the stepped pulley 40 includes, as shown more in detail in FIGS. 4(a)-(c), a disc 71 fixed to the shaft 26, a latch member 72 pivotally mounted on a shaft 73 eccentrically fixed to the disc 71 and a roller 74 rotatably mounted on a shaft 75 secured to the latch member 72. Fixed at one end to the latch member 72 is a spring 76 which is also connected at the other end to the disc 71 to bias the member 72 in the anti-clockwise direction as seen in FIG. 4(a), so that the roller 74 is always urged against releasing means 80 for disengaging the stepped pulley 40 from the latch means 70. The means 80 comprise a stationary circular disc cam 81 fixed to the plate 27, a concave cam surface 82 formed on the periphery of the cam 81 and a central hole 83 for receiving the shaft 26.

A reference numeral 90 generally designates operating means for selectively operating the ratchet means 42 at the initial position to cause engagement between the latter and the latch means 70. The means 90 include a plunger 91 mounted on the plate 27 and operated by the energization of an associated electric solenoid 92, and a lever 93 pivotally connected at its one end to the plunger 91. The lever 93 is pivotally mounted at its mid-point 94 on the plate 27 and biased by a spring 95 in the clockwise direction as seen in FIG. 4(a) when the plunger 91 is not operated. When the stepped pulley 40 is stopped and thus the original table 11 is in its initial position, a free end 96 of the lever 93 abuts against the first pin 48 of the means 42 to hold it against the action of the spring 50.

The operation of the device of the present invention described above will next be explained.

When an electric power switch (not shown) of the copying apparatus is closed, the motor 28 and the clutch 33 are energized such that the first shaft 26 is rotated together with the photosensitive element 1 in the direction of the arrow A and the second shaft 59 is also rotated in the direction of the arrow E. In this condition, the disc 71 provided with the latch member 72 is rotated with the shaft 26, while the stepped pulley 40 is stopped because it is supported on the shaft 26 for free rotation relative thereto. Therefore, the first and second wires 51 and 55 remain stopped so that the original table 11 is in the initial position. FIG. 4(a) shows the relative position, under this condition, of the lever 93, the means 42 provided on the larger diameter portion 44 of the stepped pulley 40, the disc 71 provided with the latch member 72, and the stationary disc cam 81. It should be noted that the first pin 48 of the means 42 is urged by the end 96 of the lever 93 against the action of the spring 50 such that the second pin 49 can not be engaged with the latch member 72 thereby keeping the larger diameter portion 44 and thus the pulley 40 from being rotated in the clockwise direction as seen in FIG. 4(a).

When a print switch (not shown) of the copying apparatus is closed, the solenoid 92 is energized is a moment to electromagnetically attract the plunger 91 thereby pivotally moving the lever 93 from the position shown in FIG. 4(a) to the position shown in FIG. 4(b) against the action of the spring 95. At this moment, the pin 48 is disengaged from the end 96 of the lever 93 to cause the plate 46 to pivotally move under the action of the spring 50 such that the pin 49 is positioned in the path of movement of the latch member 72 to be ready for engagement therewith. When the member 72 engages the pin 49, the pulley 40 is angularly moved together with the disc 71 from an angular position shown in FIG. 4(b) in the clockwise direction towards another angular position shown in FIG. 4(c), and thus the second wire 55 is pulled in a direction of an arrow F to cause the advance movement of the original table 11 in the direction of the arrow B. In so doing, the pulley 45 is disengaged from the wire 51 and the spring 54 is tensioned in accordance with the difference between the forward displacement of the table 11 and that of the wire 51.

A radial line X shown in FIG. 4(b) designates an angular position of the roller 74 at the time when the member 72 is just engaged with the pin 49. When the roller 74 moves on the disc cam 81 in the clockwise direction and reaches the concave cam surface 82, the roller 74 falls in the latter under the action of the spring 76 such that the latch member 72 disengages from the pin 49 (FIG. 4(c)). When this occurs, the advance movement of the table 11 is ceased and the table is returned to its initial position under the action of the spring 54, and at the same time the pulley 40 is reversely rotated under the action of the spring 54 until the pin 48 abuts against the end 96 of the lever 93 as shown in FIG. 4(a). During such reverse rotation of the pulley 40, the pulley 45 is again brought into engagement with the wire 51 tensioned by the spring 54, to damp the return movement of the pulley 40 and the table 11 such that there is caused no vibration of the table resulting from the abutment of the table against the member 23 and the table can exactly be stopped at the initial position. Since the disc 71 is always rotated in the clockwise direction, the latch member 72 is also moved in the same direction towards the plate 46 after the roller 74 has passed over the concave cam surface 82. When the member 72 reaches the position shown in FIG. 4(a), however, it can not be engaged with the pin 49, since the latter is out of the path of movement of the member 72. It is, therefore, noted that the rate of the spring 54 is selected such that the pulley 40 and the table 11 can be returned to the initial position against the damping action caused by the engagement of the pulley 45 with the wire 51 and the pulley 44 can be returned from the position of FIG. 4(c) to the position of FIG. 4(a), before the disc 71 is rotated to the position of FIG. 4(a) from the position of FIG. 4(c) in the clockwise direction. It is, further, appreciated that the stroke of the original table 11 is determined by an angle $\theta$ which is shown in FIG. 4(b) and taken from the line X on which the roller 74 is positioned to allow the lever 72 to engage with the pin 49, in the clockwise direction, to a line Y on which the roller 74 is in the concave cam surface 82 to disengage the lever 72 from the pin 49.

The return movement of the table 11 is controlled by the rotating speed of the shaft 59 in the direction of the arrow E. The pulley 53 associated with the wire 51 is mounted on the shaft 59 through the one-way clutch 61 which as described above is locked when it rotates relative to the shaft 59 in the direction opposite to the arrow D.

Figure 5:
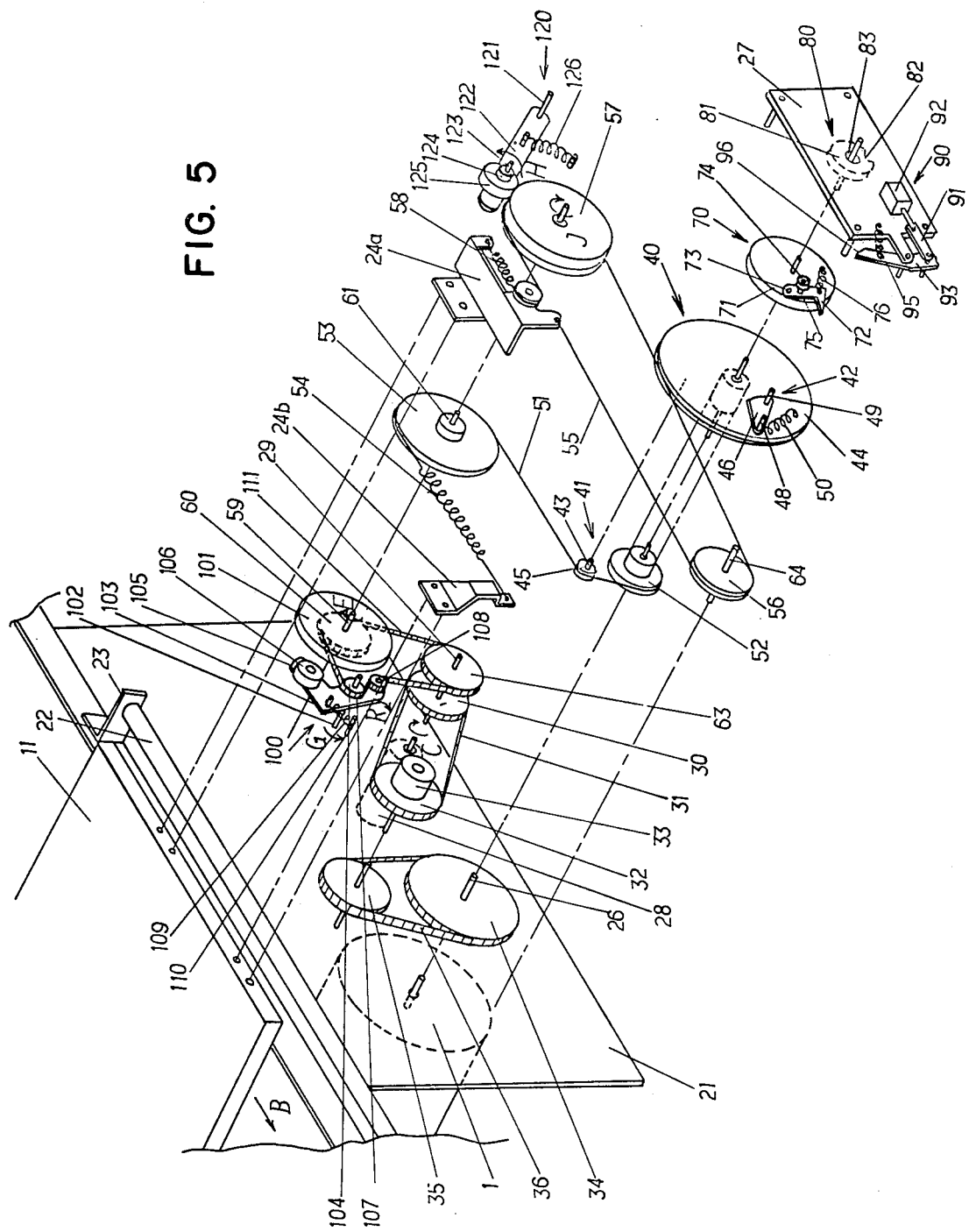
FIG. 5 is an exploded perspective view of another embodiment of the device in accordance with the present invention.

FIG. 5 shows another embodiment of the device in accordance with the present invention, of which parts and portions similar to those of the first-mentioned embodiment are referred to by the same numerals and characters.

A reference numeral 100 generally designates means for controlling the speed of the original table 11, the device 100 comprising a disc 101 fixed to the second shaft 59, a shaft 102 fixed to the side plate 21, a bell-crank lever 103 pivotally mounted on the shaft 102 and a sprocket wheel 104 rotatably mounted on the shaft 102. The lever 103 includes a first arm 105 provided at its free end with a fixed member 106 made of a friction material, such as rubber or plastic, and a second arm 107 provided at its free end with a sprocket wheel 108 rotatable relative thereto. A spring 109 is fixed at its one end to a pin 110 secured to the side plate 21 and also at the other end to the bell-crank lever 103 so as to urge the latter in a direction of an arrow G. A chain 111 is engaged with the sprocket wheels 60, 63, 104 and 108 in such a manner that the tension of the chain 111 acts on the pulley 108 to tend to urge the lever 103 against the action of the spring 109. The member 106 is positioned such that when the lever 103 pivotally moves in the direction opposite to the arrow G as will be described below the roller can frictionally be engaged with the disc 101.

When the motor 28 rotates in the direction of the arrow C, the shaft 59 is driven through the chain 111 in the direction of the arrow E. The forward movement of the original table 11 is caused similar to that in the first-mentioned embodiment.

When return movement of the table 11 is caused under the action of the spring 54, the rotational speed of the pulley 53 is increased to eventually exceed the speed of the shaft 59 driven by the motor 28, thereby operating the clutch 61 to overdrive the latter. When this occurs, the chain 111 is further tensioned to pivotally move the lever 103 against the action of the spring 109 thereby engaging the member 106 with the disc 101 to restrict the rotation of the shaft 59 to the speed at which the latter is driven by the motor 28 to control the return movement of the table 11. It is noted that the rate of spring 109 and the coefficient of friction of the member 106 are selected such that when the chain 111 is driven over the speed attained by the motor 28 the member 106 is engaged with the disc 101 to control the return movement of the table 11 as is described above.

A reference numeral 120 generally designates means for preventing jumping movement of the original table 11 when it abuts against the member 23. The means 120 includes a shaft 121 fixed to the side plate 21, a lever 122 pivotally suppreted at its end on the shaft 121, a pin 123 fixed to a free end of the lever 122, an one-way clutch 124 secured to the pin 123 and a roller 125 mounted on the clutch 124. The clutch 124 is arranged to allow the roller 125 to make free rotation in a direction of an arrow H, but prevent the reverse rotation thereof. At least the periphery of the roller 125 is formed of a friction material, such as rubber. A spring 126 is connected at its one end to a fixed portion of the apparatus and at the other end to the lever 122 to urge the latter such that the roller 125 is engaged at its periphery with the pulley 57.

With the arrangement, when the original table 11 is in its return movement, the pulley 57 is rotated in a direction of an arrow J with the roller 125 rotated in the direction of the arrow H not to lock the clutch 124. The table 11 ultimately abuts against the stop member 23, while the rate of movement of the table is reduced by the engagement of the pulley 45 with the wire 51. There may, however, be caused a risk that the table 11 is forwardly moved under the reaction of abutment of the table against the member 23 and then stopped at a position apart from the latter. The device 120 can minimize such a risk by locking the clutch 124 to frictionally contact the roller 125 with the pulley 57 thereby restraining such a forward movement of the table to arrest the latter at its initial position.

What is claimed is:

1. A device for controlling advance and return movements of an original table of an electrostatic copying apparatus wherein the table is advanced in timed relationship with the movement of a photosensitive element and returned under the action of a spring to its initial position comprising:
   (a) a first shaft rotatable in timed relationship with the movement of said photosensitive element;
   (b) a second shaft rotated at a predetermined speed in one direction;
   (c) a stepped pulley mounted on said first shaft for free rotation relative thereto;
   (d) a first pulley co-axially mounted on said second shaft through an one-way clutch operable when said first pulley rotates relative to said second shaft in said direction of rotation thereof;
   (e) a first wire passing around said first pulley and which is connected at its one end to a smaller diameter portion of said stepped pulley and at the other end through a spring to said original table;
   (f) a second wire passing around a larger diameter portion of said stepped pulley and connected at its opposite ends to said original table for movement therewith;
   (g) ratchet means provided on said stepped pulley for pivotal movement under resilience;
   (h) latch means operable to engage with said ratchet means at the initial position thereby initiating the advance movement of said original table while tensioning said spring;
   (i) releasing means for releasing said latch means to disengage from said ratchet means at a predetermined angular position thereof thereby causing the return movement of said original table under the action of said spring to the initial position; and
   (j) operating means for selectively operating said ratchet means at the initial position to cause engagement between the latter and said latch means.

2. A device according to claim 1 wherein said ratchet means comprise a ratchet member pivotally provided on said stepped pulley to be engageable with said latch means under resilience and said ratchet member being urged by said operating means against resilience at the initial position at which it is held out of engagement with said latch means.

3. A device according to claim 2 wherein said latch means comprise a disc fixed to said first shaft, a latch member pivotally mounted on said disc to abut under resilience upon a fixed disc cam for sliding movement relative thereto and said latch member being operated by said releasing means at said angular position of said first shaft to disengage from said ratchet member.

4. A device according to claim 2 wherein said operating means include a lever pivotally mounted on a fixed portion of the device, said lever being biased under resilience such that an end thereof urges said ratchet member to its initial position to maintain it out of engagement with said latch member, and an electromagnetically operable plunger pivotally connected to said lever and operated, at the commencement of advance movement of said original table, to disengage said lever from said ratchet mamber to allow the latter to be brought into engagement with said latch member.

5. A device according to claim 3 wherein said releasing means include a concave cam portion formed on said disc cam to depress said latch member at said angular position thereby disengaging the latter from said ratchet member.

6. A device according to claim 1 further comprising damping means engageable with said first wire to damp the return movement of said original table.

7. A device according to claim 6 wherein said damping means comprise a pulley mounted on the larger portion of said stepped pulley so as to be brought into engagement with said first wire when said stepped pulley is returning towards its initial position.

8. A device according to claim 1 further comprising speed control means acting on said second shaft to prevent the latter from rotating over said predetermined speed.

9. A device according to claim 8 wherein said speed controlling means comprises a lever pivotally provided on a fixed portion of the device, a friction member secured to one end of said lever, said lever being biased under resilience to position said friction member apart from said second shaft and a sprocket rotatably mounted on said lever to engage a chain for driving said second shaft such that when said chain is tensioned by the rotation of said second shaft over said predetermined speed said sprocket is urged to pivotally move said lever against resilience thereby engaging said friction member with said second shaft to prevent the latter from rotating at an excess speed.

10. A device according to claim 1 further comprising means resiliently contacted with a pulley member associated with said second wire to exert a frictional force to said pulley member when the latter is rotated to cause the advance movement of said original table.

11. A device according to claim 10 wherein said means comprises a lever member pivotally mounted on a fixed portion of the device, a friction roller rotatably supported by an one-way clutch on an end of said lever member, resilient means for urging said lever to contact said roller with said pulley member and said clutch being arranged such that when said pulley member is rotated to cause the return movement of said original table said roller is driven in response to the rotation of said pulley member, but when the reverse rotation thereof said roller is held by said clutch against rotation to exert a frictional force to said pulley member.

12. A device for controlling advance and return movements of a table of a copying apparatus wherein said member is to be advanced in timed relationship with the movement of an element of said copying apparatus and then returned under action of a spring to its initial position, comprising:
a shaft rotatable in timed relationship with the movement of said element;
a stepped pulley, having first and second connected pulley components, mounted on said shaft for free rotation relative thereto;
first coupling means for coupling said first pulley component to said table;
second coupling means for coupling said second pulley component to said table via said spring; and
operator-controllable means for temporarily engaging said stepped pulley with said shaft such that said stepped pulley rotates with said shaft and rotation of said first pulley component causes advance movement of said table and tensioning of said spring in timed relationship with said element, said engaging means including a disengaging mechanism responsive to a predetermined angular position of said stepped pulley for automatically disengaging said stepped pulley from said shaft when said predetermined angular position is reached;
whereby upon release of said stepped pulley from said shaft, said spring is operative to return said table to its initial position with the resultant rotation of the first pulley component via said first coupling means causing the stepped pulley to return to its initial angular position.

13. The device as defined by claim 12 wherein said first and second pulley components of said stepped pulley are respectively larger and smaller diameter pulleys.

14. The device as defined by claim 13 wherein said second coupling means includes:
a second shaft;
means for rotating said second shaft;
a pulley coaxial with said second shaft;
clutch means coupling said pulley and said second shaft, said clutch means being operable when said pulley rotates in the direction of rotation of said second shaft; and
a wire passing around said pulley and being coupled at one end to the smaller diameter pulley of said stepped pulley and at the other end, via said spring, to said table.

15. The device as defined by claim 14 wherein said first coupling means includes:
first and second auxiliary pulleys; and
another wire coupled to said table and passing around said auxiliary pulleys and the larger diameter pulley of said stepped pulley.

16. The device as defined by claim 12 wherein said means for temporarily engaging said stepped pulley with said shaft further comprises:
ratchet means mounted on said stepped pulley;
latch means operable to engage said ratchet means at the initial position;
releasing means for releasing said latch means to disengage from said ratchet means at a predetermined angular position thereof; and
operating means for selectively operating said ratchet means at the initial position thereof to cause engagement between said ratchet means and said latch means.

17. The device as defined by claim 14 wherein said means for temporarily engaging said stepped pulley with said shaft further comprises:
ratchet means mounted on said stepped pulley;
latch means operable to engage said ratchet means at the initial position;
releasing means for releasing said latch means to disengage from said ratchet means at a predetermined angular position thereof; and
operating means for selectively operating said ratchet means at the initial position thereof to cause engagement beween said ratchet means and said latch means.

18. The device as defined by claim 15 wherein said means for temporarily engaging said stepped pulley with said shaft further comprises:
ratchet means mounted on said stepped pulley;
latch means operable to engage said ratchet means at the initial position;
releasing means for releasing said latch means to disengage from said ratchet means at a predetermined angular position thereof; and
operating means for selectively operating said ratchet means at the initial position thereof to cause engagement between said ratchet means and said latch means.

19. The device as defined by claim 16 wherein said ratchet means comprise a ratchet member pivotally provided on said stepped pulley to be engageable with said latch means under resilience and said ratchet member being urged by said operating means against resilience at the initial position at which it is held out of engagement with said latch means.

20. The device as defined by claim 19 wherein said latch means comprise a disc fixed to said first shaft, a latch member pivotally mounted on said disc to abut under resilience upon a fixed disc cam for sliding movement relative thereto and said latch member being operated by said releasing means at said angular position of said first shaft to disengage from said ratchet member.

21. The device as defined by claim 12 further comprising damping means engageable with said second coupling means to damp the return movement of said table.

22. The device as defined by claim 14 further comprising damping means engageable with said wire to damp the return movement of said table.

23. The device as defined by claim 22 wherein said damping means comprises a damping pulley mounted on the larger diameter pulley of said stepped pulley and operative to engage said wire as the stepped pulley is returning towards its initial position.

24. The device as defined by claim 14 further comprising speed control means acting on said second shaft to prevent said second shaft from rotating faster than a predetermined speed.

* * * * *